(12) United States Patent
Vaikar (10) Patent No.: US 8,346,787 B1
(45) Date of Patent: Jan. 1, 2013

(54) METHOD AND APPARATUS FOR CONTINUOUS DATA PROTECTION

(75) Inventor: Amol Manohar Vaikar, Pune (IN)

(73) Assignee: Symantec Corporation, Mountain View, CA (US)

( * ) Notice: Subject to any disclaimer, the term of this patent is extended or adjusted under 35 U.S.C. 154(b) by 443 days.

(21) Appl. No.: 12/560,084

(22) Filed: Sep. 15, 2009

(51) Int. Cl.
*G06F 17/30* (2006.01)

(52) U.S. Cl. ........ 707/756; 707/798; 707/693; 713/193; 713/189; 726/26

(58) Field of Classification Search .................. 707/640, 707/999.201, 692, 690, 696, 698, 798, 711, 707/756, 693, 602, 803; 711/162; 726/26; 713/193, 189; 709/247
See application file for complete search history.

(56) References Cited

U.S. PATENT DOCUMENTS

| | | | |
|---|---|---|---|
| 5,542,090 A * | 7/1996 | Henderson et al. | 1/1 |
| 6,418,430 B1 * | 7/2002 | DeFazio et al. | 1/1 |
| 6,799,083 B2 * | 9/2004 | Chen et al. | 700/128 |
| 7,882,139 B2 * | 2/2011 | Zou et al. | 707/798 |
| 8,024,484 B2 * | 9/2011 | Appelman | 709/247 |
| 8,060,714 B1 * | 11/2011 | Natanzon | 711/162 |
| 8,065,739 B1 * | 11/2011 | Bruening et al. | 726/26 |
| 8,156,152 B2 * | 4/2012 | Zou et al. | 707/798 |
| 2007/0198600 A1 * | 8/2007 | Betz | 707/201 |
| 2009/0271527 A1 * | 10/2009 | Appelman | 709/247 |
| 2009/0307249 A1 * | 12/2009 | Koifman et al. | 707/101 |
| 2009/0307250 A1 * | 12/2009 | Koifman et al. | 707/101 |
| 2009/0327751 A1 * | 12/2009 | Koifman et al. | 713/189 |
| 2010/0017423 A1 * | 1/2010 | Koifman et al. | 707/101 |
| 2011/0122255 A1 * | 5/2011 | Haritaoglu | 348/180 |
| 2011/0125727 A1 * | 5/2011 | Zou et al. | 707/711 |

OTHER PUBLICATIONS

Modine, Austin, "EMC NetWorker adds de-dupe and CDP management—Avamar and RecoverPoint find a daddy," Posted in Storage, Oct. 15, 2007. Downloaded from web site http://www.theregister.co.uk/2007/10/15/snw_07_emc_networker/ on Dec. 9, 2009.
Wendt, Jerome M., "Televaulting Provides CDP and Deduplication for 'Free'; Interview with Marc Staimer, Part 2 of 2," Feb. 1, 2008. Downloaded from web site http://asigra.dciginc.com/2008/02/televaulting-provides-cdp-and.html on Dec. 9, 2009.
Waterhouse, Scott, "The Backup Blog: CDP vs. Backup," Sep. 15, 2008. Downloaded from web site http://thebackupblog.typepad.com/thebackupblog/2008/09/cdp-vs-backup.html on Dec. 9, 2009.
Waterhouse, Scott, "The Backup Blog: DL3D: The Benefits of Immediate Deduplication," Nov. 5, 2008. Downloaded from web site http://thebackupblog.typepad.com/thebackupblog/2008/11/dl3d-the-benefits-of-immediate-deduplication.html on Dec. 9, 2009.

(Continued)

*Primary Examiner* — Jean M Corrielus
(74) *Attorney, Agent, or Firm* — Campbell Stephenson LLP (57) ABSTRACT

A method and apparatus for continuous data protection is provided. In one embodiment, the method for continuous data protection comprises receiving a write request for writing at least one data segment to storage; computing, using at least one processor, a signature for the at least one segment; comparing, using at least one processor, the signature that is associated with the at least one segment with a plurality of data signatures for previously stored data segments; and processing the data segment in a manner dependent upon whether the signature matches any one of the plurality of data signatures.

11 Claims, 7 Drawing Sheets

OTHER PUBLICATIONS

Moore, Fred, "Building practical data protection strategies," Computer Technology Review, Sep. 1, 2006. Downloaded from web site http://www.thefreelibrary.com/Building+practical+data+protection+strategies-a0155784215 on Dec. 9, 2009.

Lehl, Jason, "Trends in Data Protection and Restoration Technologies," © 2008 Storage Network Industry Association, pp. 1-36.

U.S. Appl. No. 12/415,621, filed Mar. 31, 2009, entitled "Method and Apparatus for Integrating Data Duplication With Block Level Incremental Data Backup."

"Fast, Efficient Online Backups," Copyright 1999-2008 Remote Data Backups, Inc. Downloaded from web site http://www.remotedatabackups.com/features/fast-online-backups.htm on Jun. 29, 2009.

Waterhouse, Scott, "The Backup Blog: Deduplication Calculator," May 8, 2008. Downloaded from web site http://thebackupblog.typepad.com/thebackupblog/2008/05/deduplication-c.html on Jun. 29, 2009.

"Managed Backup and Recovery," Copyright 2008 LightEdge Solutions, Inc. Downloaded from web site http://www.lightedge.com/productsservices/it/backupandrecovery.html on Jun. 29, 2009.

Crump, George, "Storage Channel Tips: Backup window reduction methods," Jul. 11, 2008. Downloaded from web site http://searchstoragechannel.techtarget.com/tip/0,289483,sid98_gci1320964,00.html on Jun. 29, 2009.

\* cited by examiner

METHOD AND APPARATUS FOR CONTINUOUS DATA PROTECTION

BACKGROUND

1. Field of the Invention

Embodiments of the present invention generally relate to data protection systems and, more particularly, to a method and apparatus for continuous data protection.

2. Description of the Related Art

Many enterprises utilize block level incremental backup (BLIB) technologies to regularly backup critical data. Recently, continuous data protection (CDP) systems have been developed to ensure that all new data stored and all modifications to previously stored data are continuously replicated to a storage appliance. A CDP system is configured to remotely store data associated with every write request that is sent to local storage of a computer. By storing the data associated with every write request, the system ensures that a copy of data stored on a vulnerable, local disk drive is remotely stored and made available in case of disk drive failure. Since every write request is stored, upon restoring the data, no data will be lost.

A CDP appliance is typically connected to a data network to enable a plurality of computers to simultaneously utilize the appliance. In enterprise systems, many computers may alter a particular file within a server or the computers may store and alter the same file locally. Such editing leads to multiple copies of the same file stored on the same server or on multiple computers in a network. Each copy of the file and every modification/addition of data blocks within the file are stored in the CDP appliance. Since every write request generated by each computer within the network is communicated to the CDP appliance, the common files and portions thereof on the various computers are duplicated within the CDP appliance. Such duplication inefficiently uses storage space and processor bandwidth of the CDP appliance.

Therefore, there is a need in the art for a method and apparatus for continuous data protection that improves storage space utilization and data processing efficiency.

SUMMARY OF THE INVENTION

One embodiment of the invention is a computer implemented method for continuous data protection (CDP), where at least a portion of the method is performed by a computing system comprising at least one processor. The method comprises receiving a write request for writing at least one data segment to CDP storage; computing, using at least one processor, a signature for the at least one segment. The signature is compared with a plurality of data signatures for previously stored data segments. The method processes the data segment in a manner dependent upon whether the signature matches any one of the plurality of data signatures.

In an alternative embodiment, the processing performed by the method comprises, if the signature does not match any data signature in the plurality of data signatures, executing the write request to write the at least one data segment to CDP storage; otherwise, not executing the write request.

In an alternative embodiment, the plurality of data signatures form an index and, if the write request is executed, adding the signature to the index.

In an alternative embodiment, the method performs each write request when received and stores the signature in an index comprising the plurality of data signatures.

In an alternative embodiment, the method identifies duplicate signatures within the index and deletes a data segment from CDP storage corresponding to a duplicate signature.

Another embodiment includes a method for continuous data protection (CDP), where at least a portion of the method is performed by a computing system comprising at least one processor. The method comprises receiving a write request for writing at least one data segment to CDP storage and performing the write request. The method computes a signature for the at least one segment and stores the signature in an index of data signatures for previously stored data segments. The method searches the index to identify any duplicate signatures within the index and deletes a data segment within the storage that is identified as having a duplicate signature.

In an alternative embodiment, the method searches the index of data signatures by scanning the index at a pre-defined fixed time interval.

In an alternative embodiment, the method searches the index of data signatures by scanning the index at a variable time interval.

Another embodiment includes an apparatus for continuous data protection (CDP), comprising a write request module, a signature computation module, a signature comparison module and a data processing module. The write request receiving module receives a write request for writing at least one data segment to CDP storage. The signature computation module computes a signature for the at least one segment. The signature comparison module compares the signature that is associated with the at least one data segment with a plurality of data signatures for previously stored data segments and the data processing module processes the data segment in a manner dependent upon whether the signature matches any one of the plurality of data signatures.

In an alternative embodiment, if the signature does not match any data signature in the plurality of data signatures, the processing module executes the write request to write the at least one data segment to storage; otherwise, the processing module does not execute the write request.

In an alternative embodiment, the plurality of data signatures form an index and, if the write request is executed, the signature is added to the index.

In an alternative embodiment, the processing module performs each write request when received and stores the signature in an index comprising the plurality of data signatures.

In an alternative embodiment, the signature comparison module identifies duplicate signatures within the index and the data processing module deletes a data segment from CDP storage corresponding to a duplicate signature.

Another embodiment includes a computer-readable-storage medium comprising one or more processor-executable instructions that, when executed by at least one processor, causes the at least one processor to perform a method for continuous data protection (CDP). The method receives a write request for writing at least one data segment to CDP storage and computes a signature for the at least one segment. The method compares the signature that is associated with the at least one segment with a plurality of data signatures for previously stored data segments and processes the data segment in a manner dependent upon whether the signature matches any one of the plurality of data signatures.

In an alternative embodiment, if the signature does not match any data signature in the plurality of data signatures, the method executes the write request to write the at least one data segment to storage; otherwise, the method does not execute the write request.

In an alternative embodiment, the plurality of data signatures form an index and, if the write request is executed, the method adds the signature to the index.

In an alternative embodiment, the method performs each write request when received and stores the signature in an index comprising the plurality of data signatures.

In an alternative embodiment, the method identifies duplicate signatures within the index and deletes a data segment from CDP storage corresponding to a duplicate signature.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure enable continuous data protection. In some embodiments, a continuous data protection (CDP) agent is configured to communicate every write request to a CDP appliance. In one or more embodiments, the CDP appliance stores only unique data segments. The CDP agent cooperates with CDP software comprising a deduplication module to identify the one or more non-duplicate data segments and store only the unique data segments—duplicate data segments are either not stored or are removed from storage. As a result, storage space is conserved by identifying and eliminating duplicate data segments. Further, such deduplication processing enables the number of storage operations performed by the CDP appliance to be reduced.

Figure 1:
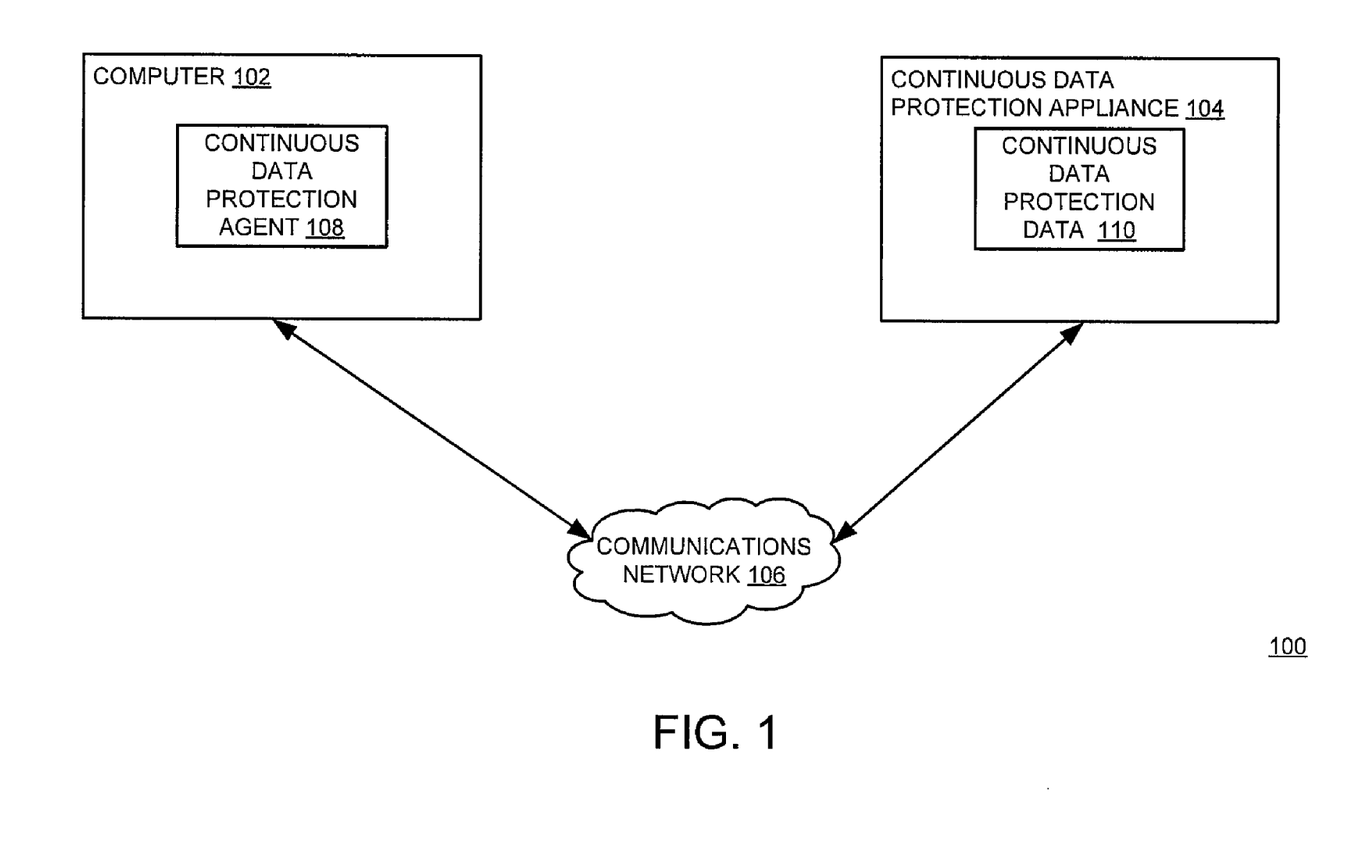
FIG. 1 is a block diagram of a system for continuous data protection, according to one or more embodiments.

FIG. 1 is a block diagram of a system 100 for continuous data protection according to one embodiment of the present invention. The system 100 may form a computing environment that includes one or more computers (for simplicity one computer 102 is depicted) and a CDP appliance 104, where each is coupled to one another through a data communications network 106.

Generally, the computer 102 is a type of computing device (e.g., a laptop, a desktop, a Personal Digital Assistant (PDA), a mobile phone and/or the like) known to one of ordinary skill in the art having the benefit of this disclosure. The computer 102 includes various software packages, such a CDP agent 108. The CDP agent 108 communicates every write request generated within the computer 102 to the CDP appliance via the network 106.

The CDP appliance 104 generally includes various components (i.e., hardware and software) that are configured to manage storage resources within the computing environment. The CDP appliance 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the computer 102. The CDP appliance 104 is used to provide data restoration upon disk drive failure within the computer 102. Additionally, the CDP appliance 104 may facilitate incremental backups of computer data to a data backup system (not shown). The CDP appliance 104 includes CDP data 110 (i.e., all write request data provided by the computer 102 over a period of time).

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure such as Ethernet, WiFi, WiMax, General Packet Radio Service (GPRS), and the like. Furthermore, the network 106 may form a portion of a Storage Network Area (SAN) using various communications infrastructure such as Ethernet, Fibre Channel, InfiniBand, iSCSI and the like.

A user of the computer 102 may utilize various software packages to create and/or modify one or more files. The files may include texts and/or graphics, such as Office files, HTML (Hyper Text Markup Language) files, PDF (Portable Document Format) files, an application file, an installation file, a configuration file, a library file, a program file, a directory file and/or the like.

According to various embodiments, the CDP agent 108 is instantiated by executing software code (e.g., processor executable instructions). The code is configured to communicate every write request and its related data to the CDP appliance 104. As the computer 102 produces write requests to write data to its disk drive, the CDP agent "splits" the write request by making a copy of the request and its associated data. The copy is then sent to the CDP appliance 104 and the original is used to update the file within storage of the local computer 102.

In one or more embodiments, the CDP data 110 may include data segments, data blocks and/or one or more files of various types (e.g., emails, word documents, aggregate data types, spreadsheets and/or the like). Generally speaking, the write request is associated with or generally contains a data segment representing the bits to be modified or added to a particular file. Throughout this description, the term data segment or segment is used to generally describe the data that is identified by the write request to be added or modified.

According to one or more embodiments, the CDP agent 108 monitors all write operations to modify and/or add data stored in the computer 102. In one or more embodiments, the CDP appliance 104 executes CDP software to identify duplicate data segments and process the duplicate segments to ensure the duplicate segments are not stored in the CDP appliance. In one embodiment of the invention, the data segment processing ensures that the write requests associated with the duplicate segments are not executed. In an alternative embodiment, the data segment processing removes previously stored duplicate data segments. Using either embodiment results in a CDP appliance that stores only unique data segments.

Figure 2:
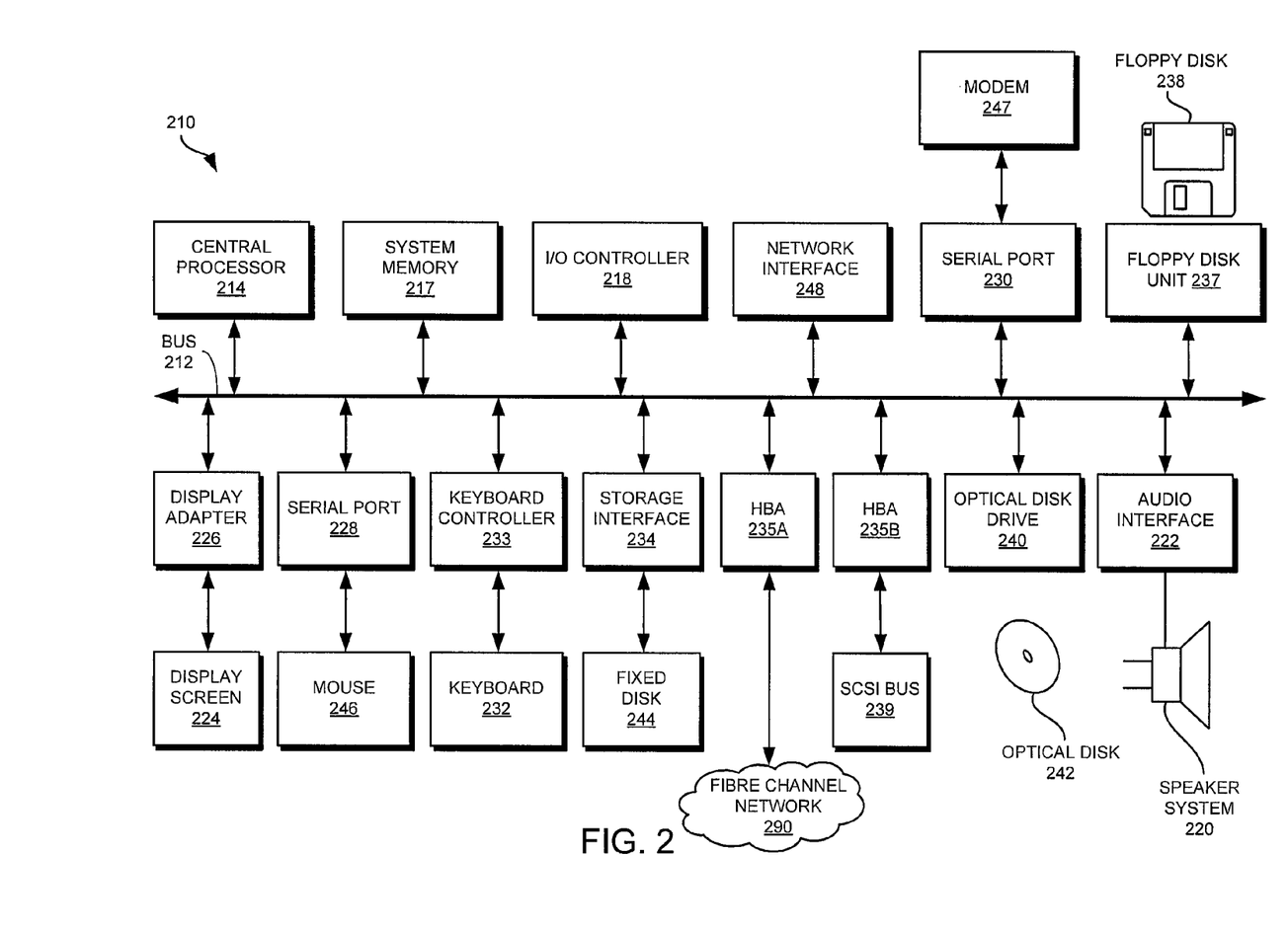
FIG. 2 is a block diagram of a suitable computer for implementing one or more embodiments of the present invention.

FIG. 2 is a block diagram of a computer system 210 suitable for implementing embodiments of the present invention. This system 210 is representative of computer hardware that can be used to implement the computer 102 and/or the CDP appliance 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement embodiments of the present invention can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
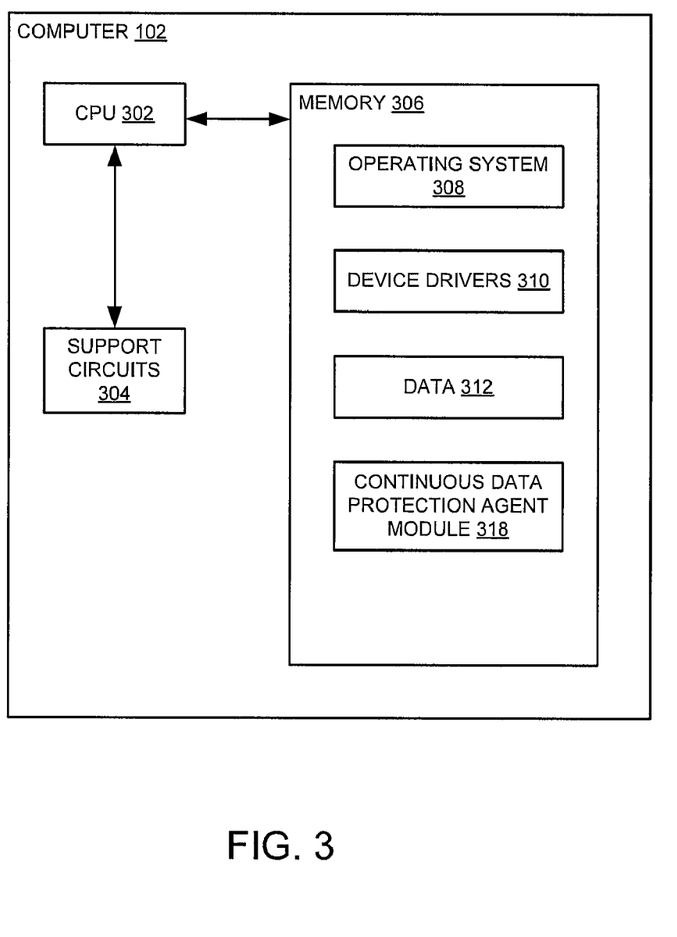
FIG. 3 is a block diagram of a computer for continuous data protection, according to one or more embodiments of the present invention.

FIG. 3 is a block diagram of the computer 102 for continuous data protection according to various embodiments of the present invention. The computer 102 is a type of computing device (e.g., a laptop, a desktop, a Personal Digital Assistant (PDA), a mobile phone and/or the like) generally known to one of ordinary skill in the art. The computer 102 includes a Central Processing Unit (CPU) 302, various support circuits 304 and a memory 306. A more detailed view of the hardware used in such a computer appears in FIG. 2. FIG. 3 contains a simplified hardware view to facilitate describing the operation of the computer when executing software embodiments of the present invention. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308, device drivers 310, as well as data 312 and a CDP agent module 318.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate write requests to the CDP appliance as explained further below.

The data 312 includes user data for one or more software applications as well as the applications themselves that are stored within the computer 102. Furthermore, the data 312 may be organized in accordance with a particular file format, such as .wav (waveform audio format), .exe (an executable file) and/or the like. In one embodiment, the data 312 may be available as an application file, an installation file, a configuration file, a library file, a program file, a directory file and/or the like. Also, the data 312 may be available as a text file, a multimedia file, a video file, an audio file, an image file and/or the like. Further, the text file may include a file that holds texts or graphics, such as Office files, HTML (Hyper Text Markup Language) files, PDF (Portable Document Format) files and/or the like. Such data 312 is stored in memory 306 as segments of defined length (number of bits). The segments are typically referred to as data blocks. When data is written by the operating system to the storage media, the operating system generates a write request containing a data block to be stored. This block either creates a new block or modifies a previously stored block.

The CDP agent module 318 includes software code (e.g., processor executable instructions) that when executed by the CPU 302 forms the CDP agent 108. The CDP agent 108 monitors write requests initiated by the operating system 308, copies the write requests (and associated data), and communicates the write request to the CDP appliance 104. In this manner, every write request is performed by the computer 102 in a standard manner as well as communicated to the CDP appliance 104.

Figure 4:
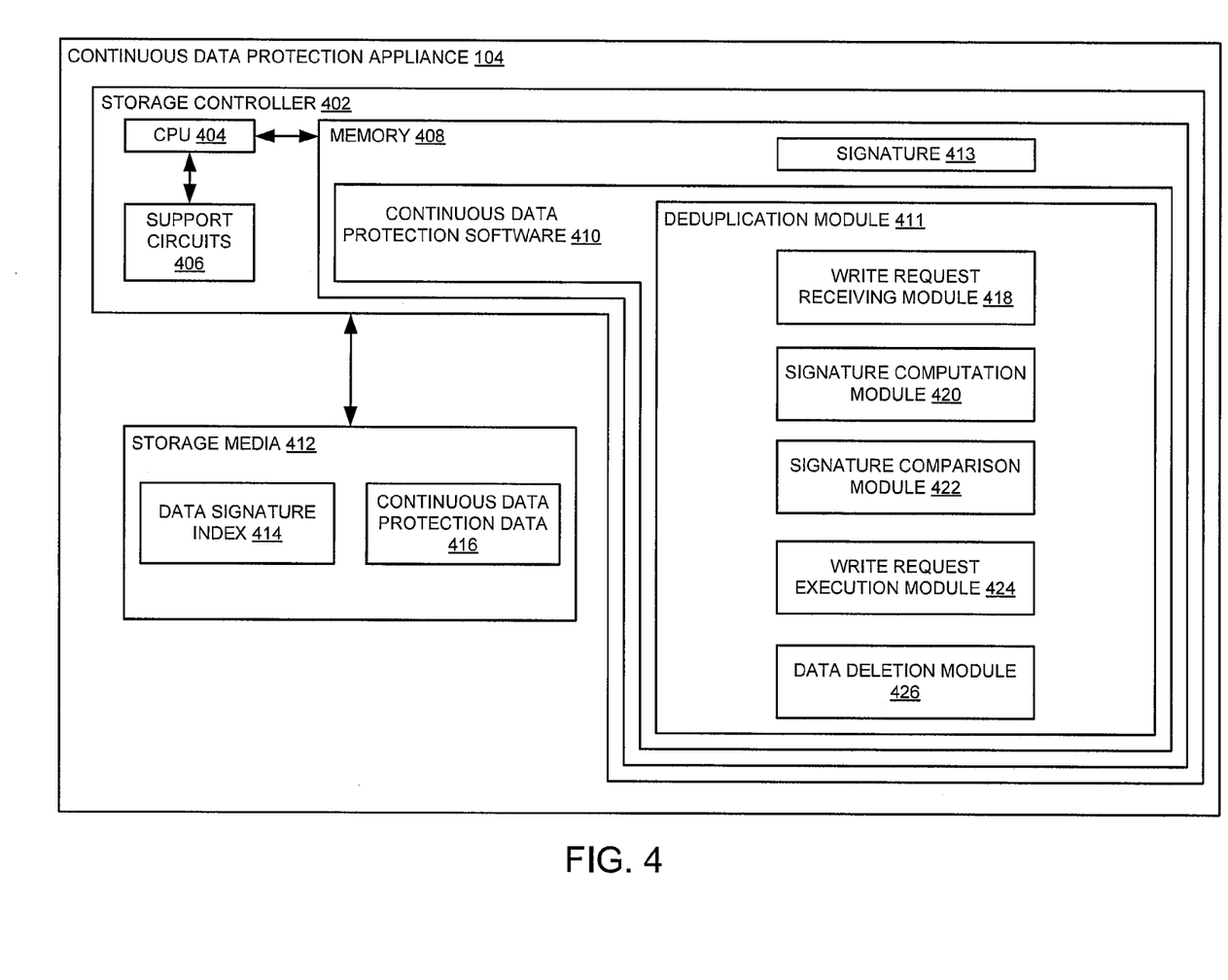
FIG. 4 is a block diagram of a storage for continuous data protection, according to one or more embodiments of the present invention.

FIG. 4 is a block diagram of CDP appliance 104 for providing continuous data protection for the computer 102 according to one embodiment of the invention. The CDP appliance 104 generally includes various components (i.e., hardware and software) that are configured to manage storage resources. The details of the hardware configuration for a CDP appliance are shown in FIG. 2. FIG. 4 depicts a simplified view of the hardware to facilitate a description of the operation of the CDP appliance when executing software in accordance with embodiments of the invention. The CDP appliance generally includes a storage controller 402 and storage media 412 (also referred to herein as CDP storage 412). The storage media 412 may include one or more data storage devices (e.g., hard disk drives, optical drives, magnetic tape drives and/or the like). The storage controller 402 may include a CPU 404, various support circuits 406 and memory 408. The memory 408 further includes CDP software 410 that provides an interface (e.g., Integrated Drive Electronics/AT Attachment (IDE/ATA), Small Computer Systems Interface (SCSI) and/or the like) to the one or more data storage devices for one or more computing devices, such as a computer (e.g., the computer 102 of FIG. 1 and the computer 102 of FIG. 3). The CDP appliance 400 facilitates copying critical computer data (e.g., the data 312 of FIG. 3) as CDP data 416 to the storage media 412. The storage media 412 further includes various data, such as a CDP data signature index 414 as explained further below.

In accordance with one embodiment of the invention, the CDP software 410 comprises a deduplication module 411. When executed by the CPU 104, the deduplication module 411 performs deduplication of the write requests to ensure that only one instance of any particular data segment is stored. One embodiment of the deduplication process operates synchronously by detecting duplicate data as it arrives from the computer 102 and not writing the duplicate data. In an alternative, asynchronous deduplication process, all write requests are performed and all data is written to the storage media, then intermittently (e.g., periodically), the deduplication module 411 is executed to detect and delete the duplicate data from the storage media 412. The synchronous and asynchronous processes are considered to be two different embodiments of a data processing procedure performed by the CDP appliance 104.

More specifically, in one embodiment, the deduplication module 316 executes a write request receiving module 418 to receive a write request and executes a signature computation module 420 to compute a signature 413 for each corresponding data segment (e.g., a data block) associated with a write request. Then, the deduplication module 316 executes a signature comparison module 422 to compare each computed signature with the CDP data signature index 414 to identify one or more duplicate data segments and/or one or more non-duplicate data segments. In various embodiments, the deduplication module 316 may utilize various functions, such as a Secure Hash Algorithm (SHA), Message-Digest Algorithm 5 (MD5), a Rabin hash, a Cyclic Redundancy Check (CRC) and/or the like to generate the signatures. For instance, a signature 413 may be a hash that is generated by a hash function, such as SHA-1, that processes a particular data segment and in response computes the hash (e.g., a SIS-level signature). If any two signatures are identical, it may be expected that any associated data segments are also identical. As such, a matching signature indicates a duplicate segment. Any data that corresponds with the duplicate segment is not stored in order to conserve storage media space. If the signature 413 does not match any other signature in the index 414, the deduplication module 411 executes a write request execution module 424 to store the data segment and the signature 413 for the newly written segment is added to the index 414.

In another embodiment, the CDP appliance processes all write requests as they arrive and stores the data. The signature computation module 420 creates a signature 413 for each data segment and stores the signature 413 in the index 414. Subsequently, the deduplication module 411 executes the signature comparison module 422 to scan the index 414 to identify any duplicate signatures within the index. The deduplication module 411 may scan the index at a pre-defined fixed time interval or a variable time interval. Once the duplicate signatures within the index are identified, the deduplication module 411 executes a data deletion module 426 to delete one or more segments within the storage that is associated with the one or more duplicate signatures.

Figure 5:
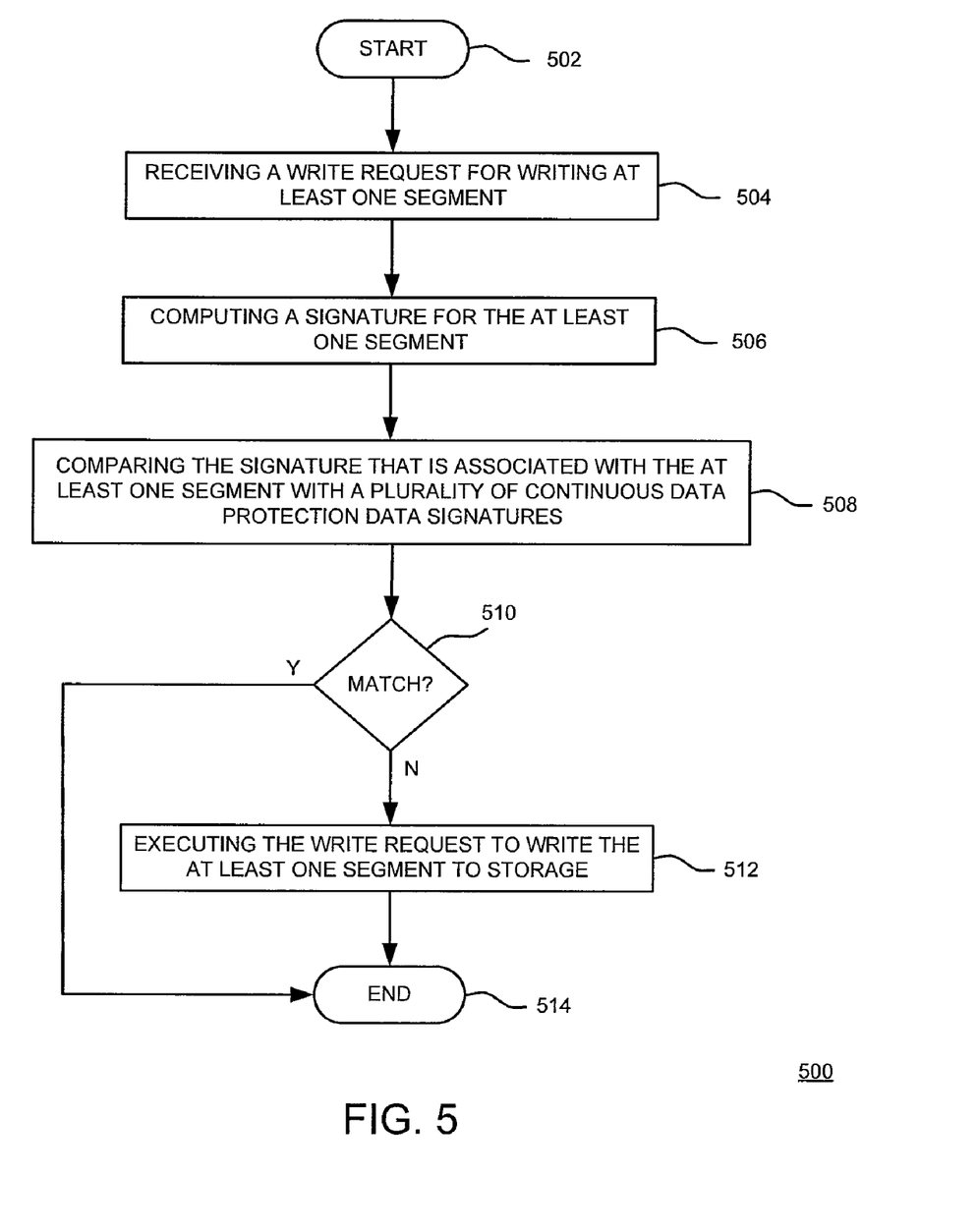
FIG. 5 is a flow diagram of a method for synchronous continuous data protection, according to one or more embodiments of the present invention.

FIG. 5 is a flow diagram of a method 500 for synchronous continuous data protection as performed by the CDP appliance 104 while executing the CDP software 410 according to one embodiment of the present invention. The method 500 starts at step 502 and proceeds to step 504, at which a write request for writing one or more segments of data is received by the CDP appliance 104. At step 506, a signature for the one or more segments is computed. The signature is a unique identifier of the content of the segment. The signature may be computed as a hash value as described above.

At step 508, the signature associated with the one or more segments is compared with a plurality of CDP data signatures associated with previously processed write requests. The comparison process involves recalling each previously stored signature and comparing the signature, bit-by-bit with the newly computed signature. At step 510, a determination is made as to whether the signature associated with the one or more segments match a signature in the index. If a match is found, (option "YES"), then the method 500 proceeds to step 514 without processing the write request.

If, at step 510, it is determined that the signature does not match a signature in the index (option "NO"), then the method 500 proceeds to step 512. At step 512, the write request to write the one or more segments to CDP storage is executed. According to various embodiments, the CDP appliance executes the one or more write requests to store the one or more non-duplicate segments to the CDP storage; thus saving storage space and optimally utilizing the CDP storage. The method proceeds to step 514, where the method 500 ends.

Figure 6:
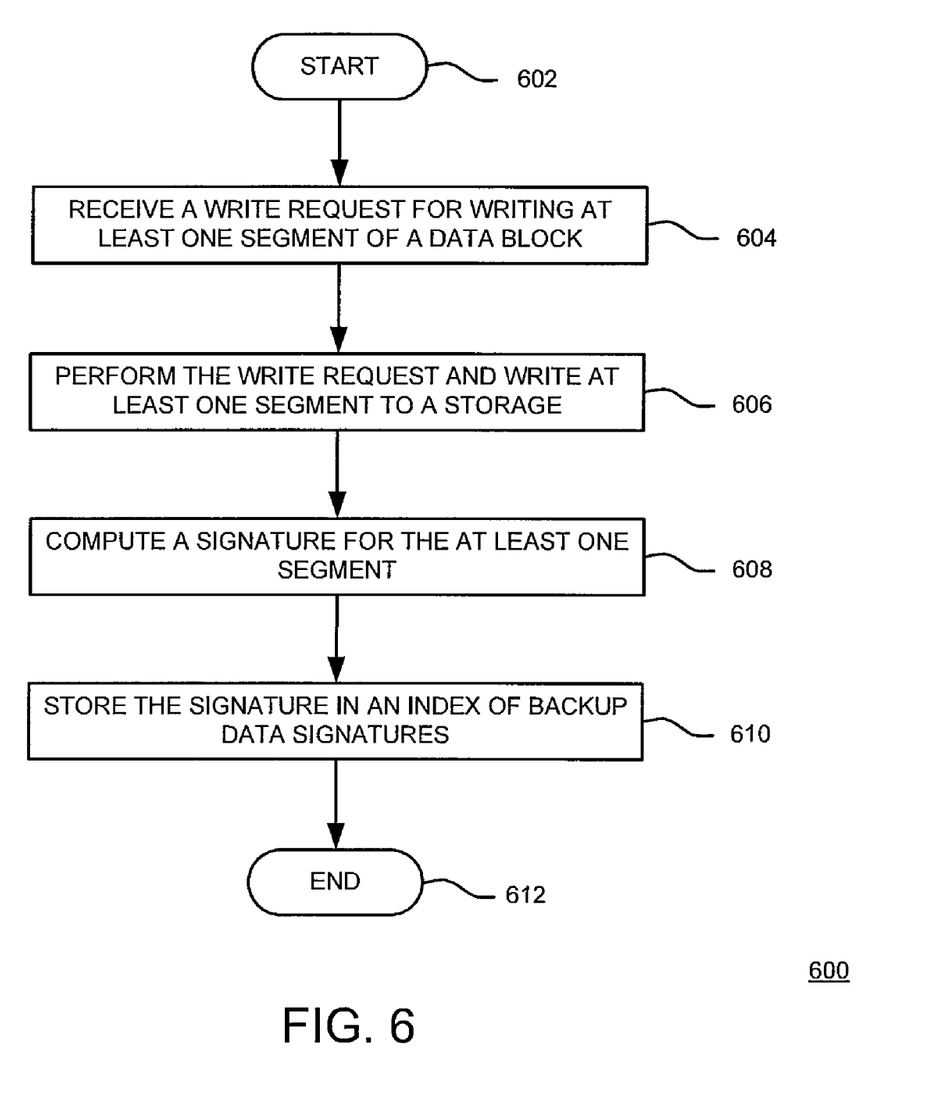
FIG. 6 is a flow diagram of a method for providing continuous data protection, in accordance with one or more embodiments of the present invention.

FIG. 6 is a flow diagram of a method 600 for continuous data protection as performed by the CDP appliance 104 while executing the CDP software 410 according to an alternative embodiment of the invention. The method 600 starts at step 602 and proceed to step 604, at which a write request for writing one or more segments of data is received by the CDP appliance 104. As described above, the write request is performed within computer 102 and a copy is captured and sent to the CDP appliance 104. At step 606, the write request is performed and the one or more segment is written to CDP storage. Thus, in this embodiment, every write request performed by the computer 102 is also performed by the CDP appliance to provide continuous data protection. At step 608, a signature for the one or more segment is computed. The signature computed as previously described above. At step 610, the signature is stored in an index of CDP data signatures. The method 600 ends at step 612. The method 600 is performed whenever a write request is communicated from the computer 102 to the CDP appliance 104.

Figure 7:
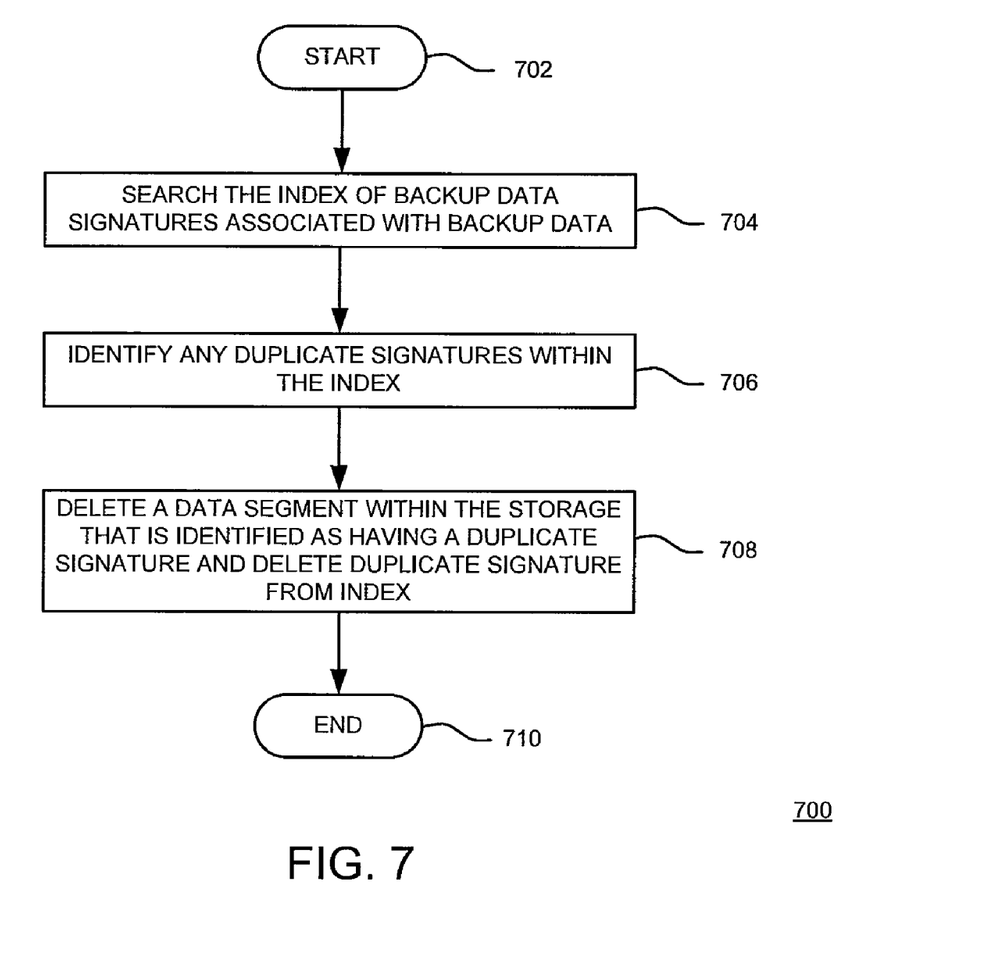
FIG. 7 is a flow diagram of a method for asynchronously deduplicating data stored using the continuous data protection method of FIG. 6, in accordance with one or more embodiments of the present invention.

FIG. 7 depicts an embodiment of a data deduplication method 700 that is intermittently (e.g., periodically or on a scheduled basis) executed to identify duplicate data and delete one instance of the duplicate data from the CDP storage. Executing this method 700 in conjunction with the method 600 defines an asynchronous continuous data protection technique. The method 700 begins at step 702 and proceeds to step 704, where the index of CDP data signatures created via method 600 is searched. At step 706, any duplicate signatures within the index are identified i.e., each signature is compared to all other signatures in the index. In some embodiments, once it is determined that the duplicate signatures exist, the method identifies the data segment associated with each duplicate signature.

At step 708, an instance of a data segment within the storage that is identified as having a duplicate signature is deleted. Additionally, the index is updated by deleting the signature corresponding to the deleted data segment. The method 700 proceeds to step 710, where the method 700 ends. Upon completion of method 700, the CDP storage contains only one instance of each data segment. Thus, substantial storage space is recovered within the CDP storage and the CDP storage is optimally utilized.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for continuous data protection (CDP), at least a portion of the method is performed by a computing system comprising at least one processor, the method comprising:
   receiving a write request for writing at least one data segment to CDP storage;
   computing a signature for the at least one data segment;
   comparing the signature that is associated with the at least one data segment with a plurality of data signatures for previously stored data segments, wherein
      the plurality of data signatures forms an index; and
   processing the at least one data segment in a manner dependent upon whether the signature matches any one of the plurality of data signatures, wherein the processing comprises
      executing the write request to write the at least one data segment to the CDP storage and adding the signature to the index, if the signature does not match any data signature in the plurality of data signatures, and
      if the signature does match any data signature in the plurality of data signatures, not executing the write request.

2. The method of claim 1 further comprising performing the write request when received and storing the signature in the index comprising the plurality of data signatures.

3. The method of claim 2 wherein the comparing identifies duplicate signatures within the index and the processing comprises deleting a first data segment from storage corresponding to a duplicate signature.

4. The method of claim 1 further comprising capturing the write request as the write request is performed within a computer and sending the write request via a network.

5. An apparatus for continuous data protection (CDP), comprising:
   a write request receiving module for receiving a write request for writing at least one data segment to a CDP storage;
   a signature computation module for computing a signature for the at least one data segment;
   a signature comparison module for comparing the signature that is associated with the at least one data segment with a plurality of data signatures for previously stored data segments, wherein
      the plurality of data signatures forms an index; and
   a data processing module for processing the at least one data segment in a manner dependent upon whether the signature matches any one of the plurality of data signatures, wherein the processing comprises
      executing the write request to write the at least one data segment to the CDP storage and adding the signature to the index, if the signature does not match any data signature in the plurality of data signatures, and
      if the signature does match any data signature in the plurality of data signatures, not executing the write request.

6. The apparatus of claim 5 wherein the processing module performs the write request when received and stores the signature in the index comprising the plurality of data signatures.

7. The apparatus of claim 6 wherein the signature comparison module identifies duplicate signatures within the index and the data processing module deletes a first data segment from CDP storage corresponding to a duplicate signature.

8. The apparatus of claim 5 further comprising an agent, operations operating on a computer, for capturing the write request performed by the computer and sending the captured write request to the write request receiving module.

9. A computer-readable-storage medium comprising one or more processor-executable instructions that, when executed by at least one processor, causes the at least one processor to perform a method comprising:
- receiving a write request for writing at least one data segment to CDP storage;
- computing a signature for the at least one s data egment;
- comparing, using at least one processor, the signature that is associated with the at least one data segment with a plurality of data signatures for previously stored data segments, wherein the plurality of data signatures forms an index; and
- processing the at least one data segment in a manner dependent upon whether the signature matches any one of the plurality of data signatures, wherein the processing comprises
  - executing the write request to write the at least one data segment to the CDP storage and adding the signature to the index, if the signature does not match any data signature in the plurality of data signatures, and
  - if the signature does match any data signature in the plurality of data signatures, not executing the write request.

10. The method of claim 9 further comprising performing the write request when received and storing the signature in the index comprising the plurality of data signatures.

11. The method of claim 10 wherein the comparing identifies duplicate signatures within the index and the processing comprises deleting a first data segment from storage corresponding to a duplicate signature.

* * * * *